UNITED STATES PATENT OFFICE.

EDWARD PROBERT, OF EUREKA, NEVADA.

PROCESS OF SEPARATING GOLD AND SILVER FROM ARSENIDE OF IRON.

SPECIFICATION forming part of Letters Patent No. 303,232, dated August 5, 1884.

Application filed September 7, 1883. (No specimens.)

*To all whom it may concern:*

Be it known that I, EDWARD PROBERT, of Eureka, county of Eureka, and State of Nevada, have invented an Improvement in Process of Separating Gold and Silver from Arsenide of Iron; and I hereby declare the following to be a full, clear, and exact description thereof.

My invention relates to a new and useful process of separating gold and silver from arsenide of iron.

My invention consists in introducing granulated litharge, or, as an equivalent, granulated lead, into the above substance after said substance has been melted and while still in a fluid state.

The operation is as follows: I first melt the substance (arsenide of iron) in a shaft, cupola, or other furnace, and then tap it out into iron pots lined with clay or other refractory substance. While the material is still in a fluid state and at the highest possible temperature I introduce about one-twelfth (more or less) of its weight of granulated litharge or granulated lead into it. The litharge is reduced by the action of the deoxidizing agents contained in the arsenide of iron, and the lead is precipitated, carrying down the silver and gold alloyed with itself. The granulated lead, when used as the equivalent of litharge, acts in a similar way, though with less effect, alloying itself with the silver and gold by its affinity for those metals during its passage downward through the bath of molten material.

The material which I treat (arsenide of iron) is shown by analysis to contain about thirty-three per cent. arsenic, sixty per cent. iron, with minute quantities of other metals, including silver and gold.

In order to remove the argentiferous or auriferous lead alloy from the pot a small tapping hole is provided in the bottom, or the whole contents may be allowed to cool and the lead alloy finally be separated after the solid block has been removed from the pot.

I am aware that litharge is universally employed as a flux in assaying and smelting ores; but in this operation it is used for the purpose of dissolving the metallic oxides and other substances constituting ores, and is therefore a true flux, and is used as such, as well as to absorb the precious metals contained in the ores; but I have found that this process does not give as satisfactory results when arsenide of iron is present as that which I have discovered. The reactions do not take place as certainly nor as completely in ordinary smelting as by a subsequent treatment of the previously-melted arsenide with litharge or lead, and it is precisely in this subsequent treatment in pots outside the furnace that the value of my invention consists. I do not therefore claim the use of litharge or lead for separating gold and silver from the arsenide of iron in the ordinary process of smelting, but simply my process, which is to treat the previously-melted substance (arsenide of iron) with granulated litharge or granulated lead while it is still in a fluid state in iron pots lined with refractory material to resist corrosion outside of and apart from the smelting-furnace.

Having thus described my process, what I claim as new, and desire to secure by Letters Patent, is—

The process of separating gold and silver from arsenide of iron, consisting in first melting said substance, tapping it out into iron pots lined with refractory material, and then introducing granulated litharge or lead into it while yet in a fluid state, substantially as herein described.

In witness whereof I have hereunto set my hand.

EDWARD PROBERT.

Witnesses:
 A. E. CHENEY,
 FRANK X. MURPHY.